Aug. 19, 1941.   J. E. KLINE   2,252,809
TAPERED HONING TOOL
Filed Feb. 18, 1939   2 Sheets-Sheet 1
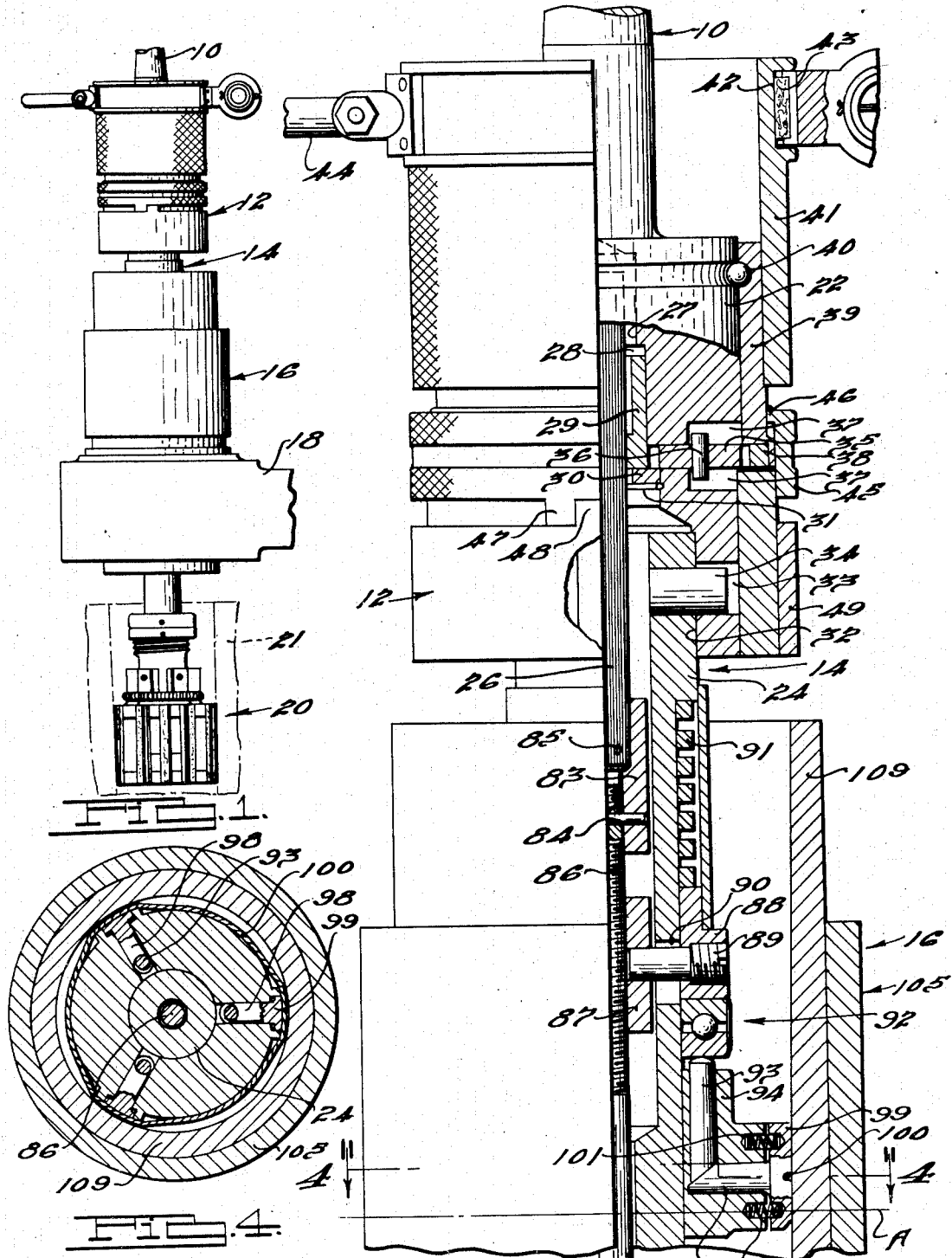
INVENTOR
John E. Kline.
BY
Harness, Dickey & Pierce.
ATTORNEYS.

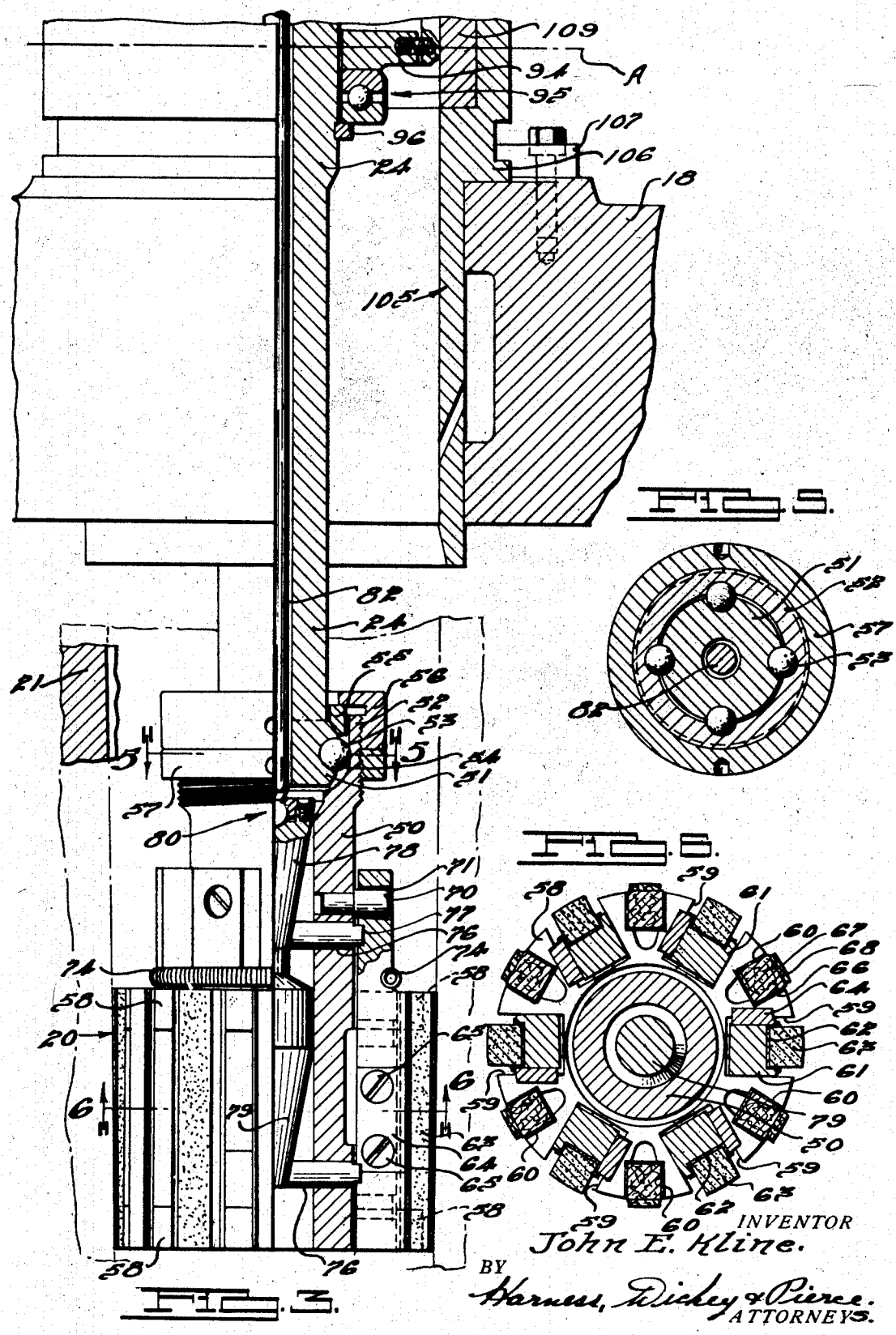

Patented Aug. 19, 1941

2,252,809

UNITED STATES PATENT OFFICE 2,252,809

TAPERED HONING TOOL

John E. Kline, Grosse Pointe Farms, Mich., assignor to Micromatic Hone Corporation, Detroit, Mich., a corporation of Michigan Application February 18, 1939, Serial No. 257,087

6 Claims. (Cl. 51—184.3)

The present invention relates to honing mechanism.

It is a general object of the invention to provide a honing mechanism having an improved means for expanding the abrading elements into contact with the walls of the work piece.

One object of the invention is to provide a superior form of honing mechanism adapted to hone tapered or conical openings in a work piece.

Another object of the invention is to provide a hone of the type mentioned in which the means for radially adjusting the abrading elements to maintain them on the surface of a cone forms part of the honing tool as distinguished from the machine in which the tool is mounted.

Another object of the invention is to provide a honing machine which can be readily adapted to grind tapered openings of different forms.

Other objects and advantages of the invention will become apparent from the following specification, the accompanying drawings, and the appended claims.

In the drawings:

Figure 1 is an elevation view showing an improved honing tool mounted in the chuck of a honing machine;

Fig. 2 is a combined elevation and half section of the upper half of the structure shown in Fig. 1;

Fig. 3 is a combined elevation and half section of the lower half of the structure shown in Fig. 1;

Fig. 4 is a section taken on the line 4—4 of Fig. 2;

Fig. 5 is a section taken on the line 5—5 of Fig. 3, and

Fig. 6 is a section taken on the line 6—6 of Fig. 3.

Referring to Fig. 1 of the drawings, there is shown a drive spindle 10 of a honing machine, which spindle carries a chuck 12 and is mounted for reciprocation and rotation with respect to the bed of the machine, not shown, in the usual manner. It will be understood that in accordance with the usual practice, the spindle will be continuously rotated and reciprocated with a stroke equal to the length of the opening to be honed. Mounted within the chuck 12 is a honing tool, indicated generally at 14, which projects downwardly through a stationary sleeve assembly, generally indicated at 16, which is carried by an arm 18 forming part of the machine. A tool head 20 is carried at the lower end of the tool 14 for performing the honing operation. The spindle 10, together with the chuck, tool, and tool head, rotate and reciprocate during the honing operation from the lowermost position, shown in Fig. 1, within the work, indicated in dotted lines at 21, to a position wherein the upper ends of the abrading elements are positioned slightly above the upper edge of the work. Upon completion of the honing operation, the spindle, chuck, and tool may be further elevated until the tool head is positioned entirely within the sleeve assembly, indicated generally at 16.

The spindle and chuck assembly, shown best in Fig. 2, are similar to that disclosed in the patent to M. C. Hutto No. 2,063,932 of December 15, 1936. In this assembly, the spindle 10 is provided with a head 22 having a central axially extending opening adapted to receive a tubular drive shaft 24 and a projecting square shaft 26 at the upper end of the tool. The central opening in the head 22 is a stepped opening having its innermost portion 27 of sufficient size to receive the upper extremity of the square shaft 26. The opening is then stepped outwardly at 28 to receive a sleeve 29 having a rotatable fit on the wall 28 of the opening and having an axially slidable, but non-rotatable fit upon the square shaft 26. The sleeve 29 is retained in the opening by means of an abutment washer 30 which is held against axial movement by means of a snap ring 31. The outer extremity of the opening in the head 22 is further enlarged at 32 to receive the upper extremity of the tubular driving shaft 24 of the tool. The lower end of the head 22 is provided with a bayonet slot 33 adapted to cooperate with a pin 34 on the tubular drive shaft 24 to retain the drive shaft in the opening 32 and transmit the rotary and axial driving forces from the chuck to the shaft 24.

Means are provided in connection with the chuck 12 for rotating the inner squared shaft 26 relative to shaft 24 to effect expansion of the abrading tool, which means includes the sleeve 29 having gear teeth which mesh with one or more pinions 35 carried by pins 36, the ends of which fit in longitudinal slots 37 in the head 22. The pinions 35 are mounted in transverse slots in the head 22 and mesh with an internal ring gear 38 carried by a sleeve 39 which is rotatably mounted upon the head 22. Suitable ball bearings 40 may be provided between the sleeve 39 and the head 22 to facilitate relative rotation. Normally the sleeve 39 and shaft 26 rotate with the head 22, but during reciprocation and rotation of the head 22 rotary adjustments of the sleeve 39 and squared shaft 26 relative to the head 22 and shaft 24 may be effected by retarding the rotation of sleeve 39 by a suitable brake means provided for this purpose. The sleeve 39 carries, fixedly secured thereto, a sleeve 41 having a brake band receiving channel 42 formed adjacent its upper end adapted to cooperate with a brake band 43 which is operated by suitable handles 44 to engage the channel 42 and retard rotation of the sleeve 39 in the manner more fully disclosed in the above mentioned Hutto patent. It will be observed that when the rotation of the sleeve 39 is retarded, ring gear 38 will rotate relative to the head 22 and effect rotation of the pinions 35 and therefore the sleeve 29, which in turn effects rotation of the squared shaft 26 with respect to shaft 24.

Means are provided for limiting the rotation of sleeve 39 relative to head 22 to a predetermined amount, which means comprises a sleeve 45 splined to sleeve 39 at 46 and provided with a downwardly projecting tongue 47 adapted to engage and abut against an upwardly projecting tongue 48 on a sleeve 49 fixed to the lower end of the head 22. Prior to the start of the honing operation, the circumferential distance between tongues 47 and 48 is manually adjusted in accordance with the maximum amount of expansion of the tool which is desired. This is accomplished by raising sleeve 45 out of engagement with the splines on sleeve 39, rotating it to the desired position, and then lowering it into engagement with the splines. Then during operation of the hone, as the brake band 43 is applied, sleeve 39 will be retarded and will, therefore, rotate relative to the head 22 until the tongues 47 and 48 engage.

The tubular shaft 24 projects downwardly from the chuck 12 and has a universal driving connection with the body 50 of a tool head 20. The universal connection, as best shown in Figures 3 and 5, is formed by a rounded head 51 on the lower end of the tubular shaft 24 and a socket 52 in which the head 51 is mounted. Four equally spaced ball bearings 53 are seated in suitable semi-spherical recesses in the head 51 and fit in curved longitudinally extending channel ways 54 in the socket 52. The head is retained against removal from the socket by retaining ring 55 having a partly spherical portion contacting the head 51. The ring 55 is retained in position by a suitable flange on a sleeve 56 threaded upon the exterior of the socket 52. A suitable lock nut 57 is provided for locking the parts in assembled position. The above described universal driving connection enables the head to tilt to a slight extent relative to the axis of the tubular shaft 24 but constitutes a rotatable and axial driving connection therebetween.

The body 50 of the tool head is provided with a pair of axially spaced, radially extending flanges 58, each of which is provided with an aligned series of slots 59 adapted to receive abrading element carriers alternated with slots 60 adapted to receive guide element carriers hereinafter described. Mounted within the slots 59 are blocks 61, the side walls of which engage and fit the sides of the slots 59. The outer surfaces of the blocks 61 are slotted to receive sheet metal channels 62 within which are mounted abrading stones 63. A clamp element 64 is mounted at one side of each block 61 intermediate its ends for clamping the stone retaining channel 62 and the stone 63 against displacement from the blocks 61. These clamping elements are secured to the blocks 61 by means of cap screws 65, as best shown in Figure 3. Mounted in the slots 60 are sheet metal channel elements 66 in which are secured in any suitable manner wooden blocks 67 having felt or leather guiding pads 68 on their outer surfaces. When the stones 63 are retracted by means hereinafter described, the pads 68 will engage the interior of the work piece and guide the head of the tool during retraction thereof without permitting the stones to contact and therefore injure the work.

Blocks 61, which carry the abrading stones, are held against axial movement with respect to the body 50 by means of pins 70. The pins 70 are press fitted into suitable openings into the body 50 and have enlarged heads which fit within outwardly flaring openings 71 in the upper ends of the blocks 61. The tapered opening 71 permits tilting of the blocks 61 relative to the axis of the tool head.

The abrading stones are urged radially inwardly towards the body 50 by means of a helical spring 74 which surrounds the tool head at the upper ends of the stones and engages the outer surfaces of the blocks 61. Means are provided for forcing the stones outwardly against the action of spring 74, which means comprises a pair of radially extending pins 76 for each block 61. The pins 76 are slidably mounted for radial movement in suitable openings in the body 50 and have squared end portions 77 fitting within suitable squared openings in the blocks 61 to prevent rotation of the pins about their own axes. The inner ends of the pins have inclined surfaces adapted to engage respectively a pair of cones 78 and 79 which are fixedly connected together and axially slidable within the body 50. It will be apparent that as the cones 78 and 79 move downwardly they will act as cams to force the pins 76, and therefore the abrading stones, radially outwardly.

The cones 78 and 79 are secured by a ball and socket joint 80 to the lower end of a rod 82 which in turn is connected at its upper end to the lower end of the squared shaft 26 previously described. The connection between the rod 82 and the squared shaft 26 is effected by means of a sleeve 83 having a squared portion adapted to receive the lower end of shaft 26 and having a lower portion threaded upon the upper end of rod 82. Suitable pins 84 and 85 are provided for fixedly securing the sleeve 83 to the rod 84 and shaft 26, respectively.

The upper end of the rod 82 is threaded at 86 and a sleeve 87 provided with cooperating threads is threaded upon the rod 82 at this portion. Sleeve 87 is fixed to a sleeve 88 slidable upon the exterior of the tubular shaft 24 by means of a plurality of pins 89 which project through axially extending slots 90 in the wall of the tubular member 24. A helical spring 91 surrounds the tubular shaft 24 and exerts a downwardly directed force upon the sleeve 88, thus tending to force the rod 82 downwardly and thereby effect outward expansion of the abrading elements of the tool head. However, downward movement of the sleeve 88 is limited by a thrust bearing 92, best shown in Figure 2, which is positioned between the sleeve 88 and a plurality of axially extending pins 93, which are positioned in circumferentially spaced relation around the tubular shaft 24 and which are slidably carried in suitable openings in an annular block 94 rotatably mounted upon shaft 24. Preferably three pins 93 are provided, as best shown in Figure 4. A second thrust bearing 95 is positioned at the under side of member 94 for preventing downward or axial movement of the latter relative to the tubular shaft 24. A locking ring 96, fitted in a suitable groove in the tubular shaft 24, supports the thrust bearing 95 on the tubular shaft. The lower ends of pins 93 are inclined at an angle of approximately 45° with respect to their axes and engage similarly inclined ends on three T-shaped pins 98, as shown in Figs. 2 and 4. The T-shaped pins have elongated axially extending heads 99 overlying the exterior surface of the annular member 94. They are retained against outward movement by means of a coil spring 100 which surrounds the annular member 94 and the heads of the T-shaped pins in the manner best shown in Figure 4. Suitable springs 101 are provided between the heads 99 of the T-shaped pins and the annular member 94 for forcing the heads outwardly against the action of spring 100. Springs 101 are of sufficient strength to overcome the force exerted by spring 100 but are of insufficient length to push the T-shaped pins 98 entirely out of the openings in member 94 in which they are disposed.

Means are provided for forcing the heads 99 of pins 98 inwardly and thereby forcing the pins 93 axially to effect axial movements of the rod 82 as the tool is moved axially with respect to the work in order that the machine may accurately hone conical openings. This means comprises a sleeve assembly, indicated generally at 16, which is mounted upon and within a suitable opening in a stationary arm 18 on the machine. The sleeve assembly comprises a supporting sleeve 105 having a downwardly projecting portion which fits within the opening in arm 18 and an outwardly projecting flange 106 which fits upon the upper surface of the arm. Suitable clamps of any desired construction may be utilized for securing the sleeve 105 fixedly to the arm 18. The central opening in the sleeve 105 is enlarged at its upper end to receive a master cam sleeve 109 which has an interior contour identical to that desired in the work piece. The particular machine illustrated in the drawings is designed to hone tapered blind ended cylinders for aircraft engines and the like and, accordingly, the master cam sleeve 109 is provided with a very slight internal taper. The arrangement of the parts is such that the heads 99 on the T-shaped pins 98 will engage and be moved radially by the walls of the master cam sleeve 109, as the tool reciprocates with respect to the work.

The operation of the machine is as follows:

The length of pins 76 is so chosen that the grinding surface of the stones 63 will lie in the surface of a cone corresponding to the desired shape of the opening in the work piece, and a master cam sleeve 109 is inserted within the supporting sleeve 105 which is the proper interior configuration to guide the cam heads 99 of the T-shaped pins 98. The head is then lowered into the work piece with the stones in retracted position and sleeve 41 is rotated by hand until the stones just bearly contact the work. It will be apparent that as sleeve 41 is rotated, it will effect rotation of ring gear 38, pinions 35, and sleeve 29, with a consequent rotation of shaft 26 and rod 82, with the result that the rod 82 will be threaded downwardly through sleeve 87 and will force the conical cams 78 and 79 downwardly to expand the stones. During this downward movement of shaft 26 it slides axially relative to the sleeve 29. Sleeve 45 is then adjusted by lifting it upwardly out of engagement with the splines on the sleeve 39 and rotating it until tongue 47 is spaced the desired distance from tongue 48. Whereupon, it is then lowered into engagement with the splines on the sleeve 39. At this point the sleeve 88 will be forced downwardly by spring 91 against the thrust bearing 92, which in turn abuts against the pin 93, the lower end of which bears against the inner end of pin 98. The pin 98 in turn bears against the interior walls of the master cam sleeve 109, thus limiting the downward movement of rod 82 under the influence of spring 91. The machine is then started, whereupon the spindle 10 will rotate continuously and will reciprocate back and forth to move the head 20 from end to end of the work piece at a relatively rapid rate. During reciprocation of the tool, the heads 99 on the T-shaped pins 98 will be forced inwardly on each downward stroke by reason of the inclined inner wall on the cam sleeve 109 and hence will force pin 93, thrust bearing 92, sleeve 87, upwardly against the action of spring 91. This withdraws the conical cams 78 and 79 from the head and permits retraction of the abrading stones, thereby maintaining the surfaces of the stones in the plane of the conical opening which it is desired to hone. When the tool moves upwardly, pins 98 move outwardly, permitting sleeves 88 and 87 to move upwardly, thereby enabling the abrading stones to be retracted by spring 74 and the walls of the opening in the work piece. It is apparent, therefore, that as the tool reciprocates back and forth in the work, the abrading stones will be alternately expanded and contracted, with the result that an accurate conical opening will be honed. As the honing operation progresses, it is necessary to expand the stones from time to time in order that they may cut further into the work piece and this is accomplished by applying the hand brake 44 to retard sleeves 41 and 39 and thereby rotate rod 82 relative to sleeve 87. When the brake is applied, the rod 82 is rotated in such a direction that it is forced downwardly, thus causing a downward movement of the conical cams 78 and 79 and consequent expansion of the abrading elements. The operator can regulate the pressure of the stones against the work by feeling the pressure applied to the brake. It will be noted that this adjustment does not interfere with the alternate expansion and contraction of the stones incident to reciprocation of the tool.

One of the important features of the present invention is the fact that the spring 91 is the only means which exerts a force tending to expand the stones under any circumstances of operation. In this connection, it will be noted that the rod 82 is free to reciprocate relative to the tubular shaft 24 and socket head 22 except insofar as it is limited in the upward direction by means of the helical spring 91. Accordingly, when the hand brake 44 is applied to rotate rod 82 and threaded downwardly through sleeve 87, the reaction to the expanding force is taken entirely by the spring 91 and if any excess pressure is developed, sleeves 87 and 88 will move upwardly against the action of spring 91. This prevents the application of an excessive pressure to the stones during expansion thereof. The same thing is true of the expansion of the stones incident to reciprocation of the tool under the influence of sleeve 109. It will be noted that the pin 98, the outer end of which bears upon the sleeve 109, acts upon the under side of sleeve 88 and forces it upwardly, in which direction of movement the abrading stones are retracted. When pin 98 moves outwardly, the spring 91 is the source of energy which forces sleeves 88 and 87 downwardly to expand the stones.

When it is desired to hone a work piece having a different conic angle, it is only necessary to grind off the ends of either the upper or lower pins 76 on the tool head or replace the pins 76 with other pins of different length and to replace the sleeve 109 with a sleeve of the desired conic angle. No other changes in the structure are required to change the shape of the opening to be honed.

One of the advantages of the mechanism is the fact that it may be applied directly to a conventional cylindrical honing machine having a chuck of the type disclosed in the aforementioned Hutto patent without any change in the machine except for the provision of a master cam sleeve. It will be noted that the installation of a master cam sleeve, such as sleeve 109, to prior honing machines is readily accomplished by reason of the fact that in prior machines a sleeve similar to the sleeve 105 herein shown is provided, within which sleeve the tool head is retracted when it is withdrawn from the work. The lower end of the sleeve 105 in the present application, as in prior machines, serves to guide the tool head as it is withdrawn from the work and insures that none of the stones will be thrown outwardly by centrifugal force.

It is preferred to utilize a cam in the shape of a sleeve, such as sleeve 109, for convenience in mounting and to avoid the necessity of aligning the pins 98 with separate axially extending cams, as would be necessary if a sleeve were not utilized. However, it is apparent that separate, axially extending cams, cooperating with each of the pins 98, may be substituted for the sleeve 109. In this event, the sleeve 94, carrying pins 93 and 98, will not rotate.

While only one form of the invention is shown and described herein, it is apparent that other embodiments and variations are available within the spirit of the invention and within the scope of the appended claims.

What is claimed is:

1. In a honing device, a rotatable and reciprocable member, a tool head having a plurality of expanding abrading elements, a tubular shaft connecting said member and tool head, axially movable cam means within the head for expanding said elements, an axially movable operating rod connected to said cam means and projecting into said tubular shaft, resilient means for urging said rod axially to effect expansion of said elements, a stop limiting the expanding action of said resilient means, means for adjusting said cam means axially independently of said resilient means, and means for automatically varying the position of said stop in accordance with the axial position of said member to hone a non-cylindrical work piece.

2. In a honing device, a rotatable and reciprocable driving member, a tool connected to said member and having a plurality of radially expanding abrading elements, resilient means for urging said elements outwardly into contact with the work, a stop for limiting outward movement of said elements under the influence of said resilient means, means for adjusting said elements radially independently of said stop, and means for automatically varying the position of said stop as the tool reciprocates with said member.

3. In a honing device, a rotatable and reciprocable driving member, a tool connected to said member and having a plurality of radially expanding abrading elements, resilient means for urging said elements outwardly into contact with the work, a stop for limiting outward movement of said elements under the influence of said resilient means, means for adjusting said elements radially independently of said stop, and means for automatically varying the position of said stop as the tool reciprocates with said member, said means including an axially fixed cam and a cooperating cam associated with said stop.

4. In a honing device, a rotatable and reciprocable driving member, a tool connected to said member and having a plurality of radially expanding abrading elements, resilient means for urging said elements outwardly into contact with the work, a stop for liimting outward movement of said elements under the influence of said resilient means, means for adjusting said elements radially independently of said stop, and means for automatically varying the position of said stop as the tool reciprocates with said member, said means including a stationary sleeve surrounding said tubular shaft and having an internal contour similar to that of the work piece to be honed and including a follower carried by said tubular shaft and engaging the internal surface of said sleeve.

5. In a honing device, a rotatable and reciprocable driving member, a tool connected to said member and having a plurality of radially expanding abrad:ng elements, resilient means for urging said elements outwardly into contact with the work, a stop for limiting outward movement of said elements under the influence of said resilient means, means for adjusting said elements radially independently of said stop, and means for automatically varying the position of said stop as the tool reciprocates with said member, said means including an axially fixed sleeve surrounding the said tubular shaft and having a cam surface corresponding in profile to the profile of the non-cylindrical work piece surface to be honed and including a cooperating cam carried by said tubular shaft.

6. In a honing device, a tool head having a plurality of radially movable abrading elements, a tubular shaft for rotating and reciprocating said head, axially movable cam means within the head for expanding said elements radially, an axially movable rod within the tubular shaft and connected to the cam means, an apertured member threaded on said rod, resilient means for urging said apertured member axially relative to said shaft in a direction to effect expansion of said abrading elements, an adjustable stop for limiting axial movement of said apertured member in response to said resilient means, and cam means operable to vary the position of said adjustable stop in accordance with the axial position of said tubular shaft to vary the radial adjustment of said abrading elements radially and maintain them on the surface of a cone, said rod being rotatable to adjust the same axially with respect to said apertured member and thereby adjust said abrading elements radially.

JOHN E. KLINE.